UNITED STATES PATENT OFFICE.

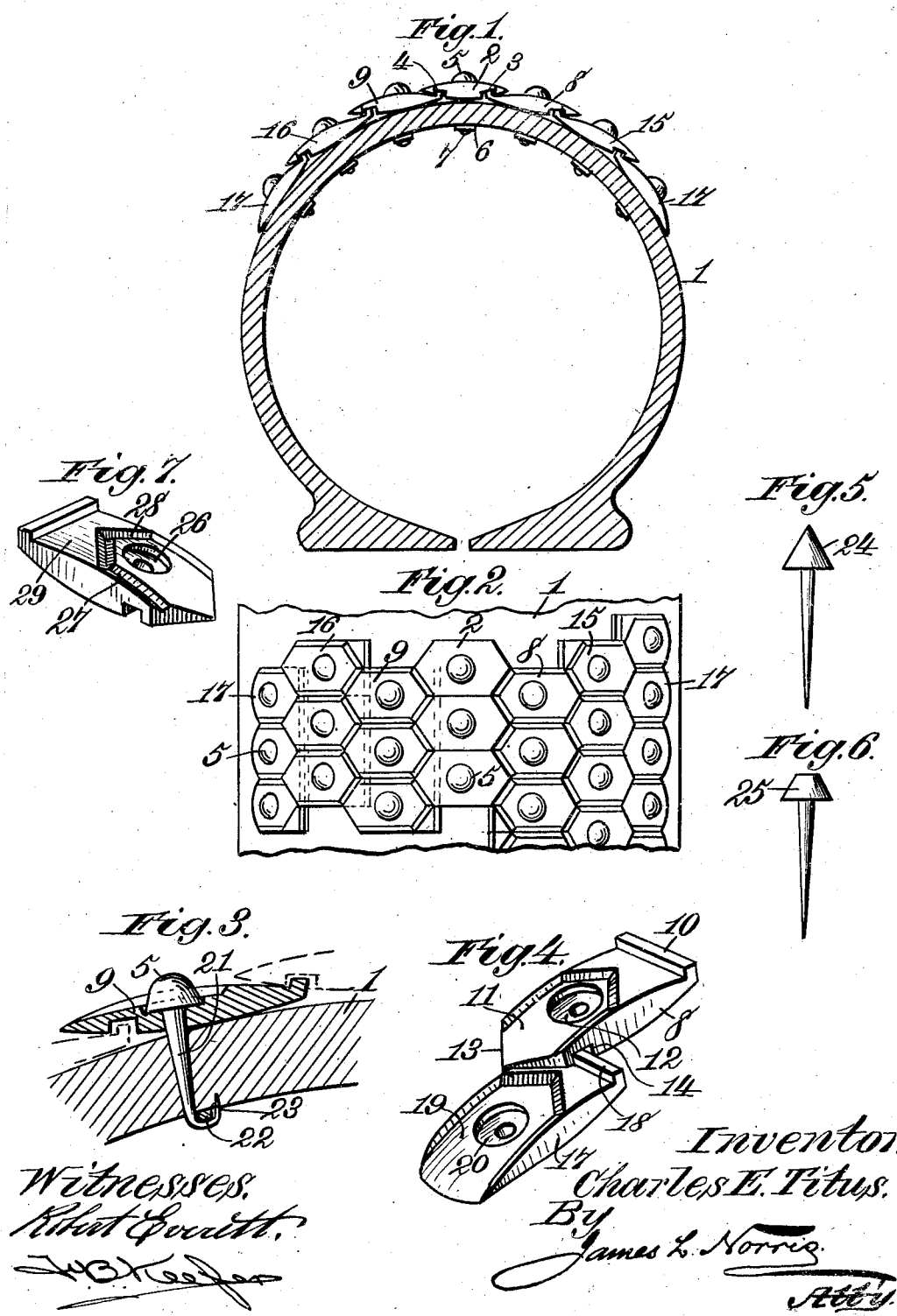

CHARLES E. TITUS, OF SPRINGFIELD, MASSACHUSETTS.

PNEUMATIC TIRE.

No. 889,069.                    Specification of Letters Patent.                    Patented May 26, 1908.

Application filed June 21, 1907. Serial No. 380,136.

*To all whom it may concern:*

Be it known that I, CHARLES E. TITUS, a citizen of the United States, residing at Springfield, in the county of Hampden and State of Massachusetts, have invented certain new and useful Improvements in Pneumatic Tires, of which the following is a specification.

This invention relates to pneumatic or cushion tires for vehicles, in which the propelling force is applied directly from the axle to the tread of the wheel; and the object thereof is to provide a tire with means, as hereinafter set forth, which acts as an armor for the tread of the tire, thereby reducing the wear thereof, as well as preventing puncturing and overcoming any liability of the tire skidding or side slipping.

With the foregoing and other objects in view, the invention consists of the novel construction and arrangement of tread elements with respect to the tire cover as hereinafter more specifically described and illustrated in the accompanying drawings wherein is shown the preferred embodiment of the invention, but it is to be understood that changes, variations and modifications can be resorted to which come within the scope of the claims hereunto appended.

In the drawings wherein like characters denote like parts throughout the several views—Figure 1 is a cross section of a tire cover with the tread elements connected thereto to constitute an armor for the cover; Fig. 2 is a plan; Fig. 3 is a sectional detail showing a modified arrangement of tread nails; Fig. 4 is a perspective view illustrating the tread reinforcing members; Figs. 5 and 6 illustrate, respectively, modified forms of tread nails, and, Fig. 7 illustrates a perspective view of a modified form of tread-reinforcing member.

Referring to the drawings by reference characters, the armor for the cover 1 of the tire is formed of a series of overlapping and interlocking tread reinforcing members each of which is secured to the cover through the medium of a tread nail. Each of the tread members which form the central part of the armor and are indicated by the reference character 2, is formed from a short piece of metallic material of greater length than width and is substantially elliptical in longitudinal section with the lower face near each end thereof formed with a traversely-extending recess. These recesses are indicated by the reference characters 3, 4. Approximately centrally of each of the members 2 a countersunk opening is provided which is adapted to receive, as shown in Fig. 1, the rounded head 60 of a tread nail, the shank of which extends through the cover 1 and has mounted on its inner end a washer 6. The inner end of the shank is upset, at at 7, thereby securing the washer upon the shank and preventing the withdrawal of the tread nail through the cover. The tread members 2 in plan are substantially hexagonal in contour.

Arranged at each side of the tread members 2 and adapted to engage with the said members are the tread members 8—9, each of which is substantially elliptical in longitudinal section and has one end formed with a ridge 10, which are adapted to engage in the recesses formed in the lower face of the members 2. The ridges 10 are not as wide as the recesses in the members 2 so as to allow for play of the members 8—9 when occasion so requires. The upper face of each of the members 9 is provided with a countersunk portion 11 and a countersunk opening 12. In the latter is mounted a rounded head 5 of a tread nail. The members 8—9 are secured to the cover 1 in the same manner as the members 2. That end of each of the members 8—9 opposite the end which is formed with the ridge 10 tapers as at 13 and the lower face of each of the members 8—9 in close proximity to the tapered end 13 is formed with a transversely extending recess 14. The members 8 as well as the members 9 are so disposed with respect to the members 2 that a pair of members 2 will be mounted upon a member 8 and a member 9; or in other words the ridge 10 of a member 8 will extend into the recesses 3 of a pair of members 2 and the same arrangement is had with the members 9 with respect to the members 2.

At one side of the members 8 is arranged a series of members 15 and at one side of the members 9 is arranged a series of members 16. The members 15 and 16 are similar in construction to the members 8 and 9 and the arrangement of the members 8 with respect to the members 15 is the same as that of the members 8 with respect to the members 2 and the same arrangement is had of the members 16 with respect to the members 9.

At one side of the members 15 and 16 is arranged the members 17 each of which is substantially rectangular in contour, substantially elliptical in longitudinal section, having one end formed with an upwardly-extending ridge as at 18, the upper face formed with a countersunk portion 19 and further provided with a countersunk opening 20 in which is mounted the rounded head 5 of the tread nail. The members 15, 16 and 17 are secured to the cover in the same manner as the members 2, 8 and 9 and the arrangement of the members 17 with respect to the members 15 and 16 is the same as that of the members 8 and 9 with respect to the members 2.

In Fig. 3 is shown a modified manner of connecting the shank 21 of the tread nail to the cover and such arrangement consists in bending the inner end of the shank 21 so as to extend around the stay piece 22 and project into the inner face of the cover as at 23.

In Figs. 5 and 6 modified forms of tread nails are shown and in this connection it will be stated that in Fig. 5 the tread nail is shown as provided with a conical shaped head 24 and in Fig. 6 with a truncated cone-shaped head 25. These nails can be used in lieu of the round head nails shown in Fig. 1.

In lieu of providing the tread members or elements with a counter-sunk portion they can be constructed in a manner as shown in Fig. 7, and in this connection it will be stated that the upper face of the tread element or member, besides being provided with a counter-sunk opening 26, is also provided with a groove 27, which is arranged along a part of each longitudinal edge of the element or member and also extends diagonally across the upper face thereof as at 28. Otherwise than as stated the tread element or member 29 shown in Fig. 7 is the same as the tread elements or members hereinbefore referred to. The construction of tread element or member shown in Fig. 7 provides for additional metal below the countersunk opening 27 for the tread nail, consequently increasing the strength of the element or member.

When the tread elements or members are secured to the cover by the tread nails the nails are entered into and through the cover without the cutting away thereof, which is quite an advantage, for the reason that the cover is not weakened. In certain tire treads made of metallic material, when applying them, a portion of the cover is cut away, consequently weakening it; whereas in accordance with this invention the tread nails pierce the tire and do not cut out or take away any material when applied. After the nails have been passed through the cover the inner end is cut off and the stub end headed or upset against a washer which connects the nails to the cover.

The interlocking of the tread members with each other prevents the outer rows of tread members from tearing out if the tire should ride hard on a stone, bringing the strain on the outer rows of tread members, and, owing to the fact that the tread members do interlock, it helps to equalize the strain.

The projecting heads of the tread nails act as a means to prevent skidding or slipping and furthermore the curved sides of the members tend to slue obstructions off the members during the travel of the wheel. It will also be evident that owing to the disposition of the metallic tread members the tread of the tire is prevented from being punctured and wear is materially reduced thereby increasing the life of the tire.

What I claim is—

1. A tire reinforcement comprising a plurality of overlapping and interengaging tread members connected to the periphery of the tire and having the central portion of its lower face constituting a fulcrum.

2. A tire reinforcement embodying a tread member substantially elliptical in longitudinal section and provided at one end with a ridge and in its lower face with a transversely-extending recess.

3. A tire reinforcement embodying a tread member substantially elliptical in longitudinal section and provided at one end with a ridge and in its lower face with a transversely-extending recess, said member further provided with a countersunk portion and a countersunk recess in its upper face.

4. A tire reinforcement embodying a tread member substantially elliptical in longitudinal section and provided at one end with a ridge and in its lower face with a transversely-extending recess, said member further provided with a countersunk portion and a countersunk recess in its upper face, combined with a tread nail for securing said member in position, said nail having an enlarged head projecting from the member and seated in said countersunk opening.

5. A tire reinforcement embodying a tread member substantially elliptical in longitudinal section and having its lower face provided with a pair of transversely-extending recesses.

6. A tire reinforcement embodying a tread member substantially rectangular in contour, elliptical in longitudinal section and having one end formed with an upwardly-extending ridge.

7. A tire reinforcement embodying a tread member substantially rectangular in contour, elliptical in longitudinal section and having one end formed with an upwardly extending ridge, said member further having a countersunk portion and a countersunk opening in its upper face.

8. A tire reinforcement embodying a tread member having the upper and lower faces thereof formed in a curvilinear manner, said member having its upper face provided with a countersunk opening to receive the head of a holdfast device and further provided with an upwardly-extending ridge.

9. A tire reinforcement embodying a tread member having a curved upper and lower face, the upper face of said member having a countersunk opening and its lower face formed with a transversely-extending recess.

In testimony whereof I have hereunto set my hand in presence of two subscribing witnesses.

CHARLES E. TITUS.

Witnesses:
GEORGE HOWLETT,
H. W. MANSFIELD.